2,906,621

METHOD OF FEEDING YOUNG MAMMALS AND FEED MATERIALS FOR USE THEREIN

Damon V. Catron, Ames, Iowa, assignor to Iowa State College Research Foundation, Inc., Ames, Iowa, a corporation of Iowa No Drawing. Application October 20, 1955
Serial No. 541,846

3 Claims. (Cl. 99—2)

This invention relates to a method of feeding young mammals and to feed materials which are adapted for practicing the method. More particularly, this invention is concerned with the method of feeding baby pigs and with baby pig feed materials.

The raising of hogs for meat production is a large national industry, and is particularly important in certain areas of the country, such as in Iowa where more than 20,000,000 hogs were produced in 1954. The national production of hogs is now approaching 100,000,000 head per year. Consequently, it is not surprising that during the past decade extensive research on improvements in the methods of producing hogs for market have been diligently carried out, and these efforts have resulted in such important contributions to swine nutrition as the use of antibiotics and vitamin $B_{12}$ in hog feeds and the recent development of the practice of early weaning. There is still, however, a marked need for further improvements in hog feeds and feeding methods. On the average, feed costs represent 80% of the total cost of hog production. Thus, if the amount of feed required to produce a pound of pork can be reduced, which is sometimes referred to as an increase in feed efficiency, the production costs will be significantly reduced. Savings can also be effected by increasing the rate of weight gain so that the hogs can be finished to a marketable weight in a shorter time, thereby reducing management costs and permitting a larger number of hogs to be produced per year for a given equipment investment.

One particular area of hog production which has continued to present a problem is the management of baby pigs from birth to 8 or 10 weeks of age. The older practice was to allow the baby pigs to nurse the sow until 8 or 10 weeks of age. This resulted in a relatively inefficient feed utilization, since the feed had to be first fed to the mother hog to produce milk for the baby pigs. This method of raising pigs on sows also produced a heavy loss of baby pigs. In the past, about one-third of all live pigs farrowed died from some cause or other before they were weaned at 8 to 10 weeks of age. Current estimates still place this figure as high as 25% on the average. Moreover, the baby pigs that survive usually weigh only from 28 to 30 pounds at weaning age (8 weeks). The development of synthetic liquid milk for baby pigs was one approach to this problem, but the high costs of synthetic milks and the difficulty involved in their feeding and management made them impractical. In 1953, the Iowa Agricultural Experiment Station found it possible to wean pigs as early as one week of age and to feed them a dry nutritionally-balanced ration called a pig pre-starter. Also, the practice is followed of letting the pigs nurse saws and supplementing the sow's milk with a so-called "pig starter" in a creep from 1 to 8 weeks of age. The use of prepared feeds, whether liquid or dry feeds or whether fed as all or part of the pig's ration, constitutes the special subject matter with which the present invention is concerned. Thus far, while present baby pig feeds have been found to be useful and desirable, there is still considerable room for further improvement.

It is therefore a general object of this invention to provide an improved method of feeding baby pigs and improved feed materials for use in such a method. More specifically, it is an object to provide a method and a means of raising baby pigs whereby their rate of weight gain and/or their feed efficiencies can be substantially increased. Further objects and advantages will appear as the specification proceeds.

This invention is based in part on the discovery that baby pigs of less than 8 to 10 weeks of age have incomplete enzyme systems. The enzyme systems of such pigs appear to be deficient in amylolytic, proteolytic, and lipolytic enzymes. Baby pigs of less than 5 weeks of age are markedly deficient in proteolytic enzymes. I have further discovered that these enzyme deficiencies can be compensated for respectively by incorporating in the baby pig feed material active concentrations of amylolytic, proteolytic and lipolytic enzymes. Such a procedure tends to give an increase in the rate of weight gain and also in the feed efficiency, and these are the important considerations from the standpoint of hog production. The use of proteolytic and/or amylolytic enzymes in this way is especially desirable.

In one of its aspects, this invention relates to a method of raising hogs wherein the baby pigs prior to 8 to 10 weeks of age or 50 pounds of body weight are fed at least partially on a starch-containing ration. In accordance with this invention, an active concentration of an amylolytic enzyme is incorporated in the starch-containing ration, and then this ration is fed to the baby pigs. Similarly, and preferably with baby pigs prior to 8 to 10 weeks of age or 50 pounds of body weight, an active concentration of a proteolytic enzyme is incorporated in a protein-containing ration, and fed to the baby pigs. Further ramifications of the present invention will now be discussed.

In practicing the present invention with baby pigs weaned at 5 pounds of body weight or heavier (or 1 week or older in age), a nutritionally-balanced feed of the following general composition can be used:

GENERAL FORMULATION

| Ingredients: | Percent |
|---|---|
| Vegetable protein | 10 to 65 |
| Animal protein | 5 to 20 |
| Cereal grains or their by-products (source of starch) | 10 to 80 |
| Sugars (sucrose, dextrose or lactose) | 2.5 to 20 |
| Source of unidentified growth factors | 1 to 15 |
| Fat (added) | 0 to 20 |
| Minerals and trace minerals | 1 to 5 |
| Vitamins (fat and water soluble) | (¹) |
| Antibiotics, arsenicals or surfactants | (¹) |

In complete rations formulated within the proportion indicated, improved results can be obtained by incorporating about 1% by weight of an active proteolytic enzyme, such as pepsin or papain. It is also desirable to include 1% by weight of an active amylolytic enzyme like animal diastase, and some of the benefits of this invention can be obtained by using the amylolytic enzyme alone. Mixtures of proteolytic and/or amylolytic enzymes are suit-

---

¹ Added to fulfill requirements.

able. For example, 1% of pancreatin may be used to provide both the amylolytic and proteolytic enzymes. Pancreatin is an extract of animal pancrease glands containing principally amylopsin (amylolytic), trypsin (proteolytic), and steapsin (lipolytic). Other lipolytic enzymes may be substituted for the steapsin. Commercial enzyme preparations at the level of 1%, such as Mycozyme are suitable. Mycozyme is a fungal or mold enzyme concentrate distributed by Paul Lewis Laboratories of Milwaukee, Wisconsin. Specifically, it is derived from cultures of *Aspergillus oryzae* and contains amylase, maltase, protease, peptidase, lipase, phosphatase, invertase, and sulfatase. Enhanced benefits may sometimes be obtained by certain combinations, viz., 1% pancreatin with 1% pepsin, 1% pepsin with 1% animal diastase, 1% pancreatin with 1% Mycozyme, etc. The various enzymes and enzyme combinations suitable for use in practicing this invention will subsequently be discussed in greater detail.

Feeding of rations formulated as described above and containing added enzymes can in many cases be advantageously continued until the pigs reach an edge of 10 weeks or older. Improved results are particularly marked from 5 to 50 pounds of body weight or during the period of approximately 1 to 8 weeks of age. Diets high in dried skim milk (e.g., 40%) tend to give diminishing returns, and therefore enzyme feeding is especially advantageous in connection with vegetable proteins and starches. However, significant improvements have been obtained with casein-cornstarch diets and soya protein-lactose diets. Casein alone is improved. It should also be noted that rations prepared according to this invention can be used as "creep feeds" while the baby pigs are still being nursed by their mothers (sows) or as only part of the complete diet after weaning.

With regard to specific ration formulations, it will be understood that the relative proportions and kinds of proteins, cereal grains or their by-products (containing mostly starch), fats, etc. will be related to the known nutritional requirements of baby pigs. These requirements vary with age. As baby pigs grow older, less protein and more carbohydrate-containing ingredients will normally be incorporated in the ration. For example, at the age of 1–2 weeks, the crude protein level could be 20 to 25%; at 2–5 weeks, 16 to 18%; at 5–8 weeks, 14 to 16%. This may permit the amount of proteolytic enzyme additive to be correspondingly decreased and the permissible decrease is assisted by the developing enzyme system of the animal. Conversely, the starch-containing ingredients of the diet will usually be increased, starting with as little as 10% at 1–2 weeks to as much as 80% at 8–10 weeks. For example, corn or other cereal grains may form well over half the diet from 5 to 8 weeks of age. Therefore, the offsetting effect of the animals, developing enzyme systems will tend to be less pronounced with regard to starches under normal feeding practices. Consequently, it may be desirable to increase the amount of amylolytic enzyme added to the ration as the pigs grow older (until their amylolytic enzyme systems are fully developed) and are fed a higher proportion of starches.

As already indicated, this invention contemplates the incorporation in a starch and protein-containing baby pig ration of an active concentration of an amylolytic enzyme and a proteolytic enzyme. Since corn or other material containing starch are basic feed ingredients for pigs, amylases are especially desirable. If the starch has been partially or completely dextrinized or if the formula contains certain sugars, the amylases will also be of value. The hydrolysis of glucosides and disaccharides can be promoted by the incorporation of glucosidases. These may be rather specific, such as the maltases, sucrases, invertases, and lactases. More generally, various carbohydrases can be used. In addition to the proteinases, it may be desirable to include peptidases. Most proteinases only hydrolyze proteins to the proteases, peptones, and peptides.

In addition to the enzymatic materials already mentioned, a number of commercial enzyme preparations having proteolytic and/or amylolytic activities are suitable. Among the proteases are Rhozyme A–4, P–11, B–6, as well as Protease 15, all manufactured and sold by Rohm & Haas Company of Philadelphia, Pennsylvania. While these enzyme preparations are primarily proteolytic, they also act on starches, with the exception of Rhozyme P–11 which contains no diastases. Rhozyme B–6 and Protease 15 are of bacterial origin and the other products are fungal enzymes. Another primarily proteolytic enzyme product which is suitable for use in the present invention is Bromelain, manufactured by the Paul Lewis Laboratories of Milwaukee, Wisconsin. Bromelain is a mixture of several enzymes derived from pineapple juice and contains proteolytic enzymes. Ficin, produced and sold by Merck & Company of Rahway, New Jersey, may also be used. It is a proteolytic enzyme occurring in the latex of tropical trees.

Instead of animal diastase or amylopsin, various bacterial diastases can be used with benefit. For example, Rhozyme H–39 (Rohm & Haas) is a suitable heat stable bacterial diastase. Other enzyme products having an amylolytic as well as a proteolytic action have already been listed. For example, enzyme mixtures having both amylolytic and proteolytic properties can be obtained from moldstrains of Rhizopus and Aspergillus. Similarly, amylolytic and proteolytic bacterial enszymes are produced by strains of *Bacillus mensentericus*. Amylases can be obtained from *B. macerans*, *B. polymyxa* and *B. subtilis*, suitable strains being selected for the desired purpose.

In one preferred embodiment of this invention, the suckling pigs are weaned at individual weights of about 5 pounds and are then fed over a period of at least three weeks a nutritionally-balanced dry or liquid feed ration containing a proteinaceous material as a principal ingredient in combination with a sufficient amount of a proteolytic enzyme to hydrolyze a substantial portion of the proteinaceous material. This feeding is continued until the pigs have individual weights of about 50 pounds. Following the same procedure, the feed mixture may contain a suitable amount of an amylolytic enzyme, and this is especially desirable when the feed material contains a substantial amount of starch or other starchy materials such as ground corn, oats, wheat or barely. For example, the ration may contain ground corn and soybean protein as the principal ingredients. Generally, vegetable proteins and starches may advantageously be used in combination with proteases and amylases.

The procedure for practicing the present invention and the benefits obtained thereby are further illustrated by the following specific examples.

EXAMPLE I

A series of experiments were conducted to study the effects of supplementing soybean and milk protein diets with various proteolytic enzymes for early weaned baby pigs and for older growing pigs. In the first experiment, as reported below in this example, the pigs are individually fed, whereas in the experiments reported in Examples II and III, the pigs were group fed. Crossbred pigs were used in all cases and randomly allotted. The baby pigs were weaned from the sows at 6 to 10 days of age, depending on body weight, age relationship and started directly on the dry experimental diets. Baby pig management as described by Speer et al., Iowa Farm Science, 8:10:3 (1954), was followed. They were self-fed dry rations and watered automatically. All pigs were weighed and the feed consumption recorded weekly. The rations were mixed weekly to minimize the possibility of enzyme inactivation by other feed ingredients. The basal diets for the three experiments were as follows:

BASAL DIETS

| Ingredient | Experiment | | |
|---|---|---|---|
| | Ex. I | Ex. II | Ex. III |
| Drackett C-1 assay protein [a] | 29.70 | 29.70 | 23.70 |
| DL-methionine | 0.10 | 0.10 | 0.10 |
| Corn starch | 10.00 | 10.00 | 0.00 |
| Sucrose | 12.10 | 7.10 | 10.00 |
| Dextrose | 36.46 | 21.36 | 34.46 |
| Lactose [b] | 0.00 | 20.00 | 20.00 |
| Di-calcium phosphate | 3.95 | 3.95 | 3.76 |
| Calcium carbonate | 0.66 | 0.66 | 0.89 |
| Trace minerals (CCC 35 D-10) [c] | 1.63 | 1.63 | 1.63 |
| Salt ($I_1$) | 0.50 | 0.50 | 0.50 |
| Vitamins and antibiotics [d] | 0.40 | 0.50 | 0.50 |
| Lard (stabilized) | 2.50 | 2.50 | 2.50 |
| Gr. dried beet pulp | 2.00 | 2.00 | 2.00 |
| | 100.00 | 100.00 | 100.00 |
| Percent crude protein | 25 | 25 | 20 |

[a] Purified soybean protein containing 83.1% crude protein. (When dried skim milk, casein or other proteins were included, the relative quantities of Drackett protein and sugars were altered to maintain a constant protein level.)
[b] When dried skim milk was added, lactose was not included.
[c] Tecmangam 2.453%; $FeSO_4 \cdot 7H_2O$ 11.068%; copper carbonate 0.085%; cobalt sulfate 0.059%; zinc sulphate 0.553%; magnesium sulphate 30.437%; magnesium carbonate 0.922%; potassium sulfate 54.418%; KI (Ca stearate) 0.04%.
[d] Calculated analysis per pound of diet: Vitamin A 5000 I.U.; vitamin $D_2$ 1000 I.U.; riboflavin 5 mg.; pantothenic acid 10 mg.; niacin 30 mg.; choline chloride 450 mg. Added per pound of diet: Vitamin $B_{12}$ 20 mcg.; folic acid 9 mcg.; thiamin 5 mg.; pyridoxine 2 mg.; para-aminobenzoic acid 8 mg.; biotin 20 mcg.; inositol 250 mg.; alpha-tocopherol 10 mg.; Menadione 3 mg.; ascorbic acid 300 mg.; chlorotetracycline 50 mg.

The results of the first series of tests are summarized below in Table I:

Table I

| Ration treatment [a] | Initial wt.,[b] lb. | 5 wk. wt., lb. | Gain, lb. | Relative gain, percent | Feed/lb. gain, lb. | Feed saving, percent |
|---|---|---|---|---|---|---|
| (1) Basal ration | 6.3 | 19.2 | 12.9 | 100 | 2.24 | 0 |
| (2) Basal with 20% lactose | 6.3 | 21.4 | 15.1 | 117 | 2.06 | +8 |
| (3) Basal+1% pancreatin (U.S.P.) | 6.4 | 21.4 | 15.0 | 116 | 2.01 | +10 |

[a] Five individually fed pigs per treatment.
[b] Average initial age=8.0 days.

EXAMPLE II

Further tests were conducted following the procedure described in Example I, the results being summarized below in three parts:

Table II

PART 1

| Ration treatment [a] | Initial wt.,[b] lb. | 5 wk. wt., lb. | Gain, lb. | Relative gain, percent | Feed/lb. gain, lb. | Feed saving, percent |
|---|---|---|---|---|---|---|
| (1) Basal ration [c] | 6.2 | 14.9 | 8.7 | 100 | 2.57 | 0 |
| (2) Basal+1% pancreatin (U.S.P.) | 6.4 | 15.6 | 9.2 | 106 | 2.53 | +2 |
| (3) Basal+1% pepsin (1:3000 N.F.) | 6.6 | 16.5 | 9.9 | 114 | 2.46 | +4 |
| (4) Basal+1% pepsin+1% pancreatin | 6.4 | 16.5 | 10.1 | 116 | 2.43 | +5 |

[a] Single pens of 5 pigs each. Total 20 pigs.
[b] Initial age=7.3 days.
[c] Includes 20% lactose. See Ex. I.

PART 2

| Ration treatment [a] | Initial wt.,[b] lb. | 5 wk. wt., lb. | Gain, lb. | Feed/lb. gain, lb. |
|---|---|---|---|---|
| (1) Basal ration [c] | 7.0 | 19.3 | 12.3 | 2.13 |
| (2) Basal+1% pepsin+1% pancreatin [d] | 7.1 | 22.9 | 15.8 | 1.74 |

[a] Replicated pens of 4 pigs each. Total 16 pigs.
[b] Initial age=13.2 days.
[c] Includes 20% lactose. See Ex. I.
[d] Two pigs died.

PART 3

| Ration treatment [a] | Initial wt.,[b] lb. | Final wt.,lb. | Gain, lb. | Feed/lb. gain, lb. |
|---|---|---|---|---|
| (1) Basal ration [c] | 28.0 | 47.0 | 19.0 | 1.94 |
| (2) Basal+1% pepsin+1% pancreatin | 28.1 | 47.7 | 19.6 | 1.84 |

[a] Replicated pens of 4 pigs each. Total 16 pigs.
[b] Initial age=53.4 days. 14 days on test.
[c] Includes 20% lactose. See Ex. I.

EXAMPLE III

The results of further experiments are summarized below:

Table III

| Ration treatment [a] | 5 wk. wt.,[b] lb. | Gain, lb. | Relative gain, percent | Feed/lb. gain, lb. | Feed saving, percent |
|---|---|---|---|---|---|
| (1) Basal ration [c] | 14.2 | 8.4 | 100 | 2.82 | 0 |
| (2) Basal +1% pancreatin [d] (U.S.P.) | 16.3 | 10.0 | 119 | 2.41 | +15 |
| (3) Basal+1% pepsin (1:3000) | 16.2 | 10.4 | 124 | 2.20 | +22 |
| (4) Basal + 1% pepsin +1% pancreatin | 16.8 | 10.8 | 129 | 2.18 | +23 |
| (5) Basal plus 1% papain | 16.6 | 10.4 | 124 | 2.36 | +16 |
| (6) Basal plus 1% Mycozyme [e] | 16.8 | 10.8 | 129 | 2.31 | +18 |
| (7) Basal incl. casein [f] | 19.9 | 13.9 | 165 | 1.76 | +38 |
| (8) No. 7 plus 1% pepsin plus 1% pancreatin | 21.4 | 15.6 | 186 | 1.60 | +43 |
| (9) Basal plus 40% dried skimmilk | 19.9 | 14.0 | 167 | 2.06 | +27 |

[a] Two replicated pens of 4 pigs each per treatment. Total 72 pigs.
[b] Average initial weight and age=6.0 lb. and 8.6 days.
[c] Includes 20% lactose. See Ex. I.
[d] Two pigs became unthrifty during experiment and were removed.
[e] Mold enzyme concentrate of Paul Lewis Laboratories, Milwaukee, Wisconsin, containing both amylases and proteases.
[f] Casein added at the level contributed by 40% dried skimmilk.

Statistical analysis of the above data gave the following results:

(1) Casein diets produced significantly ($P=0.05$) heavier pigs at 5 weeks of age on significantly ($P=0.05$) less feed than Drackett protein diets.

(2) Average effect of all enzyme additions to Drackett protein basal diets significantly improved feed efficiency ($P=0.05$).

EXAMPLE IV

In this experiment, involving 80 pigs, animal diastase was fed at levels of 0, 0.01, 0.1 and 1.0% alone and in combination with levels of fungal amylase fed at 0, 0.01, 0.1 and 1.0% alone and in combination. These were added to a basal diet similar to that used in Example II, except casein replaced the Drackett C-1 assay protein and cornstarch comprised the source of carbohydrate. The addition of 1% animal disastase improved gains 31.6% and saved 34% of the feed required to make these gains. The addition of .10% fungal amylase improved gains 4% and improved feed efficiency 22.1%. When a combination of 1% animal diastase and .1% fungal amylase was fed, daily gains were improved 75.9% with a feed saving of 64.6% over the pigs fed the basal diet without the addition of enzymes.

EXAMPLE V

Further tests were conducted following the procedure described in Example I. The basal diet was similar to Example I. The results show that the addition of 1% pancreatin to such a diet increased gains 21% and saved 20% on feed. When this soya fraction protein was hydrolyzed enzymatically with 3% pancreatin (3 x USP) at a pH of 7 for six hours at 40° C. and then was drum-dried at 120° F., and when this pre-digested soya fraction was included in the basal diet, relative gains were increased 148% with a saving of 120% on feed required. When the same soya fraction was pre-digested in the same manner, except for 24 hours, gains were increased 175% with a feed saving of 123% when compared with performance of the pigs on the basal diet. This demonstrates the improvement of vegetable protein by enzymatic hydrolysis. Some degree of improvement in vegetable protein can also be expected by plain chemical hydrolysis without using the enzyme. The tabulated data appears below.

Table IV

| Ration treatment | Initial wt.,[b] lb. | 5 wk. wt., lb. | Total gain, lb. | Relative gain, percent | Feed/lb. gain, lb. | Feed saved, percent |
|---|---|---|---|---|---|---|
| (1) Soybean fraction[a] protein-basal diet | 6.3 | 9.1 | 2.82 | 0 | 5.86 | 0 |
| (2) Basal diet plus[a] 1% pancreatin | 6.4 | 9.8 | 3.42 | +21 | 4.88 | +20 |
| (3) Pancreatin pre-digested[a] soybean fraction protein for 6 hrs | 6.3 | 13.3 | 6.98 | +148 | 2.66 | +120 |
| (4) Pancreatin pre-digested[a] soybean fraction protein for 24 hrs | 6.2 | 13.9 | 7.76 | +175 | 2.62 | +123 |

[a] Includes 20% lactose.
[b] Initial average age 13.2 days (final average age 36.2 days).
4 ration treatments.
3 replications (pens)/ration treatment.
4 pigs/pen.
48 total pigs.

Many variations in the procedures described above would fall within the scope of the present invention. For example, the starch material employed in the feed ration can be any of the various edible starches or starch-containing food substances and is not limited to corn starch. Other grains or cereals and their starches may be used, as well as root starches like potato starches. Many foodstuffs of vegetable origin contain both starch and protein and can therefore be used to supply the nutritional requirements of both types of nutrients. While vegetable proteins like the protens in soybeans can be used in the feed rations with particular advantage, milk proteins and meat proteins are also suitable. Among the various protein sources that can be mentioned are meat scraps, fish proteins (fish meal), peanut oil meal, cottonseed oil meal, copra, etc. The starches and proteins, moreover, do not need to be in their original form as found in nature, and can be altered in various ways including partial or complete chemical and/or enzyme hydrolysis to the respective component simple sugars or protein degradation products. For example, starch might be partially or completely dextrinized, and some of the dextrinized material might be broken down further to glucose. Similarly, the proteins might be partially hydrolyzed to proteoses or peptides, and these hydrolysates further hydrolyzed, in part, to amino acids. This can be accomplished by treating protein or starch-containing food materials with various suitable enzymes for accomplishing the desired hydrolysis, such as amylolytic enzymes and proteolytic enzymes like those described above, and then feeding the treated material to baby pigs in accordance with this invention. This is demonstrated in Example V. Chemical hydrolysis of proteins or starches can also be used while realizing some of the advantages of this invention. Further ramifications of this invention include the use of lipolytic or cellulolytic enzymes respectively with edible fats and vegetable celluloses in a manner similar to that described for the proteolytic and amylolytic enzymes. The present invention has been described with particular reference to baby pigs, but it is not necessarily limited to this use. More generally, it is applicable to young mammals including particularly dogs, cattle and sheep during the period when the baby animals would normally be fed on the natural milk of their species. When the enzyme systems of the animals are incomplete, this invention provides a means for correcting such deficiencies and/or supplementing and intensifying the action of the natural enzymes.

Additional ramifications and variations in the present invention will readily occur to those skilled in the art, and it is therefore the intention to have the present disclosure interpreted as broadly as it would be by a man skilled in this particular art.

I claim:

1. A growth-accelerating feed for baby pigs, comprising a nutritionally-balanced baby pig feed composition containing an undegraded proteinaceous material as a principal ingredient in admixture with an active proteolytic enzyme, said composition being finely-divided and in a dry, free-flowing cond'tion, whereby said proteinaceous material is substantially stable in the presence of said proteolytic enzyme.

2. The feed of claim 1 in which said proteinaceous material is of vegetable origin and in which said enzyme is pepsin.

3. The feed of claim 1 in which said proteinaceous material is derived at least in part from milk and in which said enzyme is pepsin.

References Cited in the file of this patent

UNITED STATES PATENTS

| 394,413 | Barret | Dec. 11. 1888 |
| 1,477,964 | Laughlin | Dec. 18, 1923 |
| 2,450,318 | Wagamon | Sept. 28, 1948 |
| 2,452,534 | Jeffreys | Nov. 2, 1948 |
| 2,700,611 | Jeffreys | Jan. 25, 1953 |

OTHER REFERENCES

Skorkov, U. A.: Nutrition Abst. & Revs. 15, #900, 1945.

Hastings; Poultry Science 25 (1956), pages 584–6.

UNITED STATES PATENT OFFICE
CERTIFICATE OF CORRECTION

Patent No. 2,906,621 September 29, 1959

Damon V. Catron

It is hereby certified that error appears in the printed specification of the above numbered patent requiring correction and that the said Letters Patent should read as corrected below.

Column 8, line 39, for "undegrated" read — undegraded —.

Signed and sealed this 12th day of April 1960.

(SEAL)
Attest:

KARL H. AXLINE
Attesting Officer

ROBERT C. WATSON
Commissioner of Patents